United States Patent [19]

Löbbert

[11] Patent Number: 5,177,819
[45] Date of Patent: Jan. 12, 1993

[54] WATERLESS TOILET WITH CONTAINERS WITH LIDS FOR WASTE

[76] Inventor: Johannes Löbbert, Industriestrasse 1, 4405 Nottuln 2, Fed. Rep. of Germany

[21] Appl. No.: 629,878

[22] Filed: Dec. 19, 1990

[30] Foreign Application Priority Data

Dec. 19, 1989 [DE] Fed. Rep. of Germany ....... 3941939

[51] Int. Cl.⁵ .............................................. A47K 11/06
[52] U.S. Cl. ......................................... 4/484; 4/144.2
[58] Field of Search .................... 4/449, 474, 476, 485, 4/486, 484, 247; 220/469, 629

[56] References Cited

U.S. PATENT DOCUMENTS

| | | | |
|---|---|---|---|
| 2,376,036 | 5/1945 | Cotton | 4/484 |
| 2,866,980 | 1/1959 | Huntington | |
| 2,956,851 | 10/1960 | Merendino | 206/362.1 X |
| 3,063,061 | 11/1962 | Bertram | 4/484 |
| 3,430,269 | 3/1969 | Bradshaw | 4/486 |
| 3,495,278 | 2/1970 | Peters | |
| 3,881,868 | 5/1975 | Duke | 206/209.1 |
| 4,621,380 | 11/1966 | McGill | 4/460 X |
| 4,710,989 | 12/1987 | Grenthe | 4/449 |
| 4,760,613 | 8/1988 | Bobak | 4/247 |
| 4,766,617 | 8/1988 | Thygesen et al. | 4/247 X |
| 4,927,011 | 5/1990 | Wilkinson | 206/217 |
| 5,074,500 | 12/1991 | Loebbert | 248/99 |

FOREIGN PATENT DOCUMENTS

| | | |
|---|---|---|
| 468100 | 11/1928 | Fed. Rep. of Germany . |
| 823923 | 12/1951 | Fed. Rep. of Germany . |
| 7103988 | 2/1971 | Fed. Rep. of Germany . |
| 7205756 | 2/1972 | Fed. Rep. of Germany . |
| 3246187 | 7/1984 | Fed. Rep. of Germany . |
| 1174621 | 3/1959 | France . |
| 2098909 | 3/1972 | France . |
| WO8802614 | 4/1988 | PCT Int'l Appl. . |
| WOA8803416 | 5/1988 | PCT Int'l Appl. . |

*Primary Examiner*—Daniel M. Yasich
*Attorney, Agent, or Firm*—Sprung Horn Kramer & Woods

[57] ABSTRACT

A waterless toilet with a seat for use with a container (15) that accommodates the waste, that can be closed, that has a rim resting against the seat while the toilet is in use, and that can be removed from the seat, closed, and deposited once the toilet has been used. The toilet has snap-in components (17) distributed around its rim and a lid (26) that covers the container after it has been used. The lid has snap-in components (27) that fit tight into the snap-in components on the rim, sealing the container hermetically and allowing someone to lift it out by grasping the lid.

13 Claims, 6 Drawing Sheets

WATERLESS TOILET WITH CONTAINERS WITH LIDS FOR WASTE

BACKGROUND OF THE INVENTION

The invention concerns a waterless toilet with a seat for use with a container that accommodates the waste, that can be closed, that has a rim resting against the seat while the toilet is in use, and that can be removed from the seat, closed, and deposited once the toilet has been used.

A waterless toilet of this type is known from the U.S. Pat. No. 3 495 278. The container is a flexible bag. The seat has a mechanism that rotates, once the toilet has been used, in relation to the bowl, which constitutes an outer container, twisting and accordingly sealing the bag with the waste inside it. The twisted-shut bag can be lifted out and conveyed to a disposal site.

The user must accordingly carry out certain manipulations in the vicinity of the seat as well as lifting the bag out and removing it. One drawback is that when the toilet is employed in a public area (aircraft, camp, bus, etc.) it is impossible to ensure that every user will carry out all the steps necessary to leave the toilet clean.

A container for waste from severely sick patients is known from the German Patent Publication No. A 468 1100. A replaceable sack covers the inner surface of the container. The open sack of waste drops into a receptacle through a trap and is later removed to a pit, tank, or similar structure. The drawback is that the sack of waste remains open in the receptacle, which accordingly gets dirty and must be cleaned. A powerful odor can also be expected to pervade the vicinity of the receptacle, and removing the waste is a particularly unpleasant task.

Known from the German Utility Model Patent No. U 7 205 756 is a container especially intended for use as a chemical toilet. The container has a removable lid that seals odors in tight while it is not being used. After use the container must be cleaned like a conventional toilet. After the container has been used only once, the lid, which opens easily, can be opened inadvertently or by the expanding gases that accompany the disintegration of such waste. This container is accordingly not a hygienic solution to the problem.

Another toilet is known from the German Utility Model Patent No. U 7 103 988. This toilet has a seat with a pitlike chamber under it. The chamber is heat insulated and communicates with a refrigerating system. When the waste drops into the pit, it freezes. The inner surface of the pit is lined with a bag. The bag is extracted with the deep-frozen waste inside it and removed before it can thaw. The drawback to this device is that waste leaves the body at 36°, which represents a lot of heat to dissipate, so that a lot of power is needed to freeze it. An expensive freezer with a loud motor for its compressor, however, is not welcome at camp sites. Furthermore, the problem of where to deposit the waste still remains.

SUMMARY OF THE INVENTION

The principal object of the present invention is accordingly to eliminate the drawbacks characteristic of the prior art and to provide a waterless toilet that will ensure smooth and hygienic operation and make the users' and maintenance personnel's experience with it as minimally unpleasant as possible.

This object, as well as other objects which will become apparent in the discussion that follows, are achieved, in accordance with the invention in a waterless toilet of the aforesaid type, by snap-in components distributed around its rim and by a lid that covers the container after it has been used. The lid also has snap-in components that fit tightly into the snap-in components on the rim, sealing the container hermetically and allowing someone to lift it out by grasping the lid. The container will preferably remain sealed until it is finally buried or burned, and accidental opening or bursting as the result of expanding gas will in principle be eliminated.

It is preferable for the lid to be made from a relatively rigid material, so that the container suspended from it need not be touched. It is preferable for the lid to have at least one handle.

The edge of the lid can wrap around the edge of the container or fit inside it to hermetically seal the container. The container is preferably made of flexible plastic, especially plastic sheet. Its rim and lid, on the other hand, are made from a relatively rigid material, allowing the aforesaid sealing procedures to be carried out unexceptionably.

The base of the toilet is preferably in the shape of a stool with a depression that can be accessed from above. It is at least to some extent surrounded by a seat, into which the container can be inserted.

To facilitate applying the lid there is a supporting structure at the bottom of the depression for the container to rest on. The supporting structure can preferably be raised and lowered.

Another practical feature is that the supporting structure can be exploited to compact the container so that the container is reducible in size before the lid is applied. The rising supporting structure forces the rim of the container against the lid while the seat rests against it and presses the snap-in components together.

The invention will now be described in detail with reference to the accompanying drawings.

DESCRIPTION OF THE PREFERRED EMBODIMENTS

Figure 1:
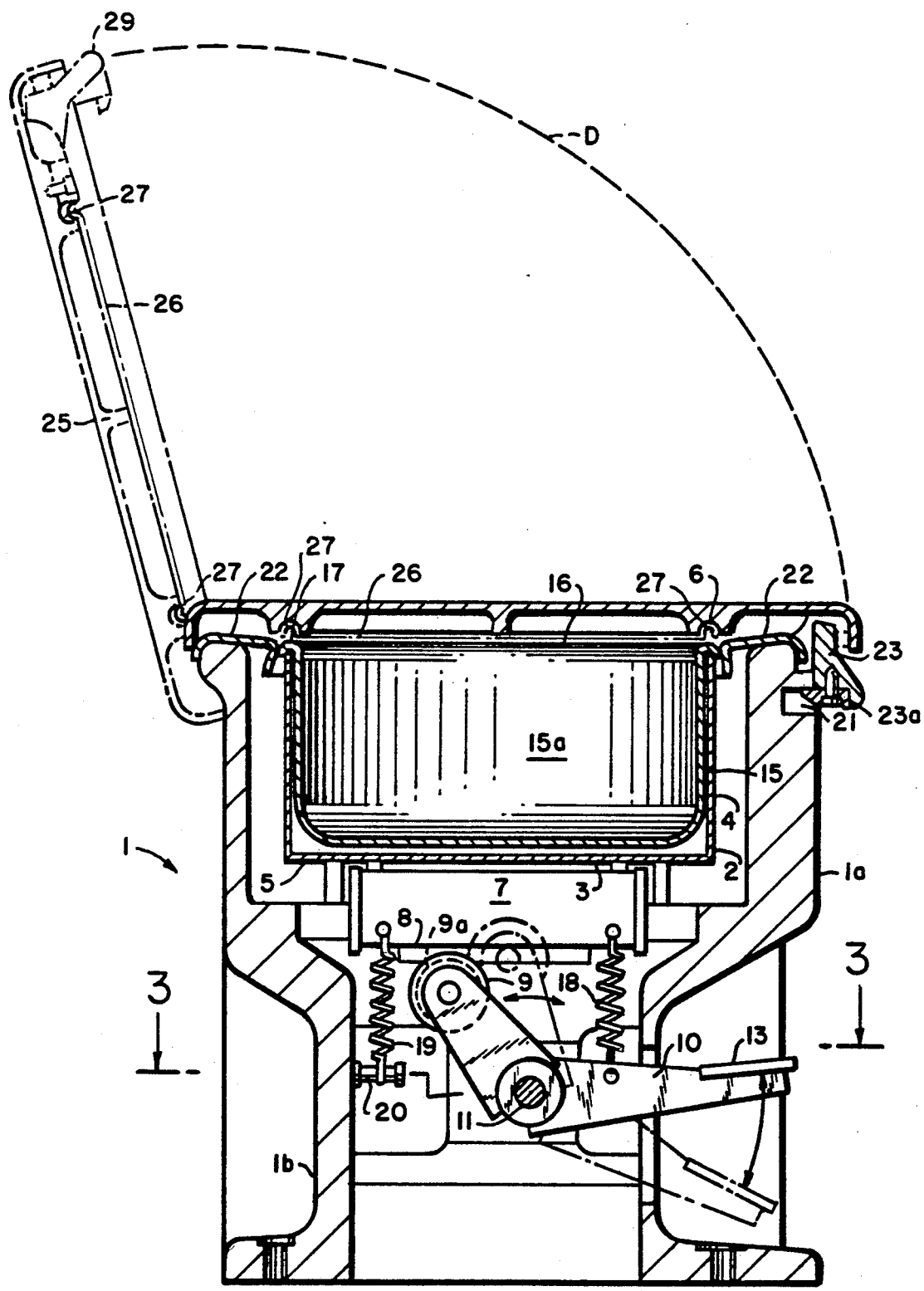
FIG. 1 is a side view of one embodiment of a waterless toilet with the lid up.
Figure 2:
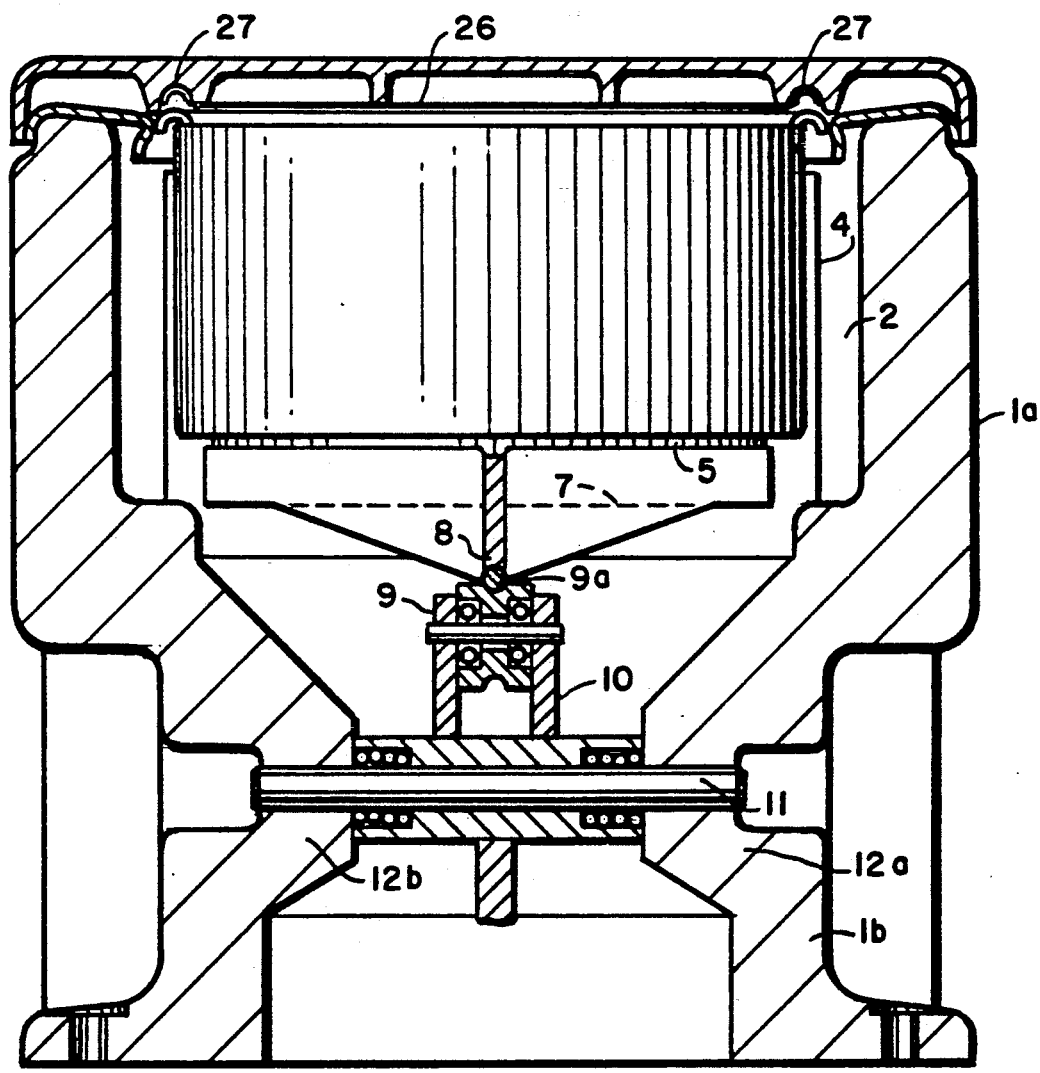
FIG. 2 is a side view of the toilet in FIG. 1 with the lid down and sealed.
Figure 3:
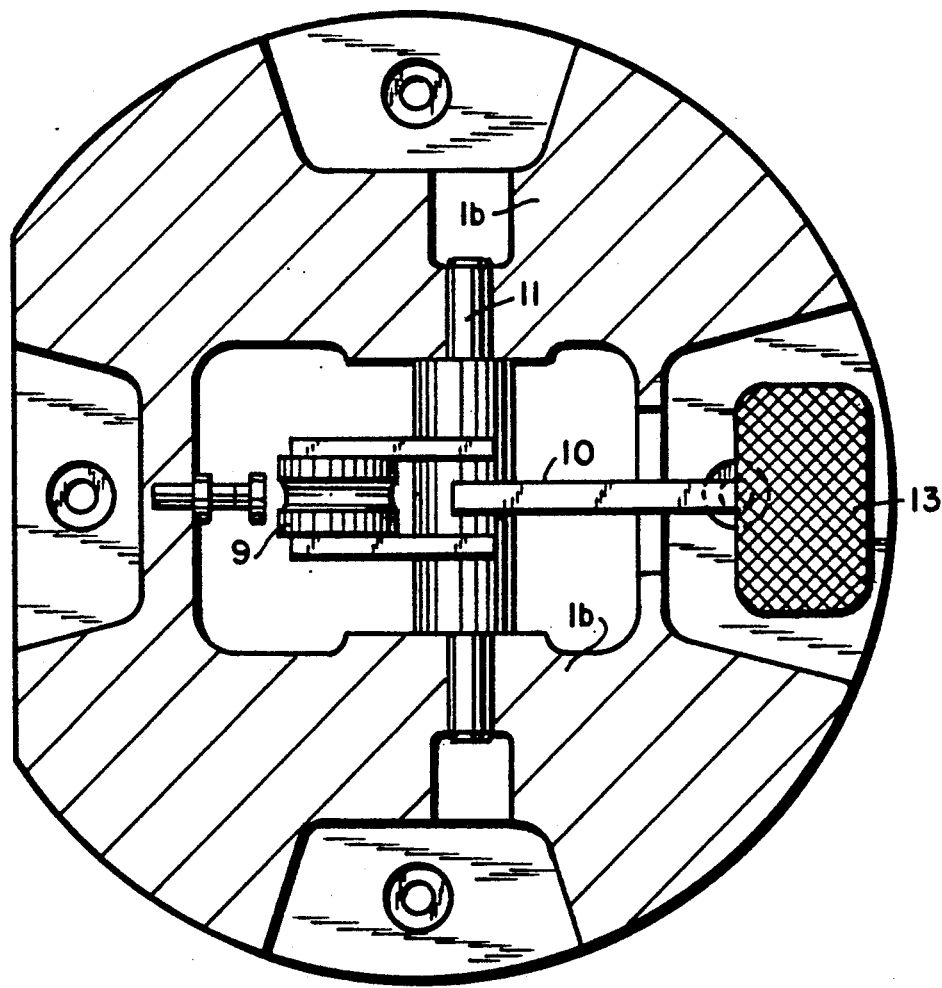
FIG. 3 is a cross-sectional view, taken along the line A-B in FIG. 1.
Figure 4:
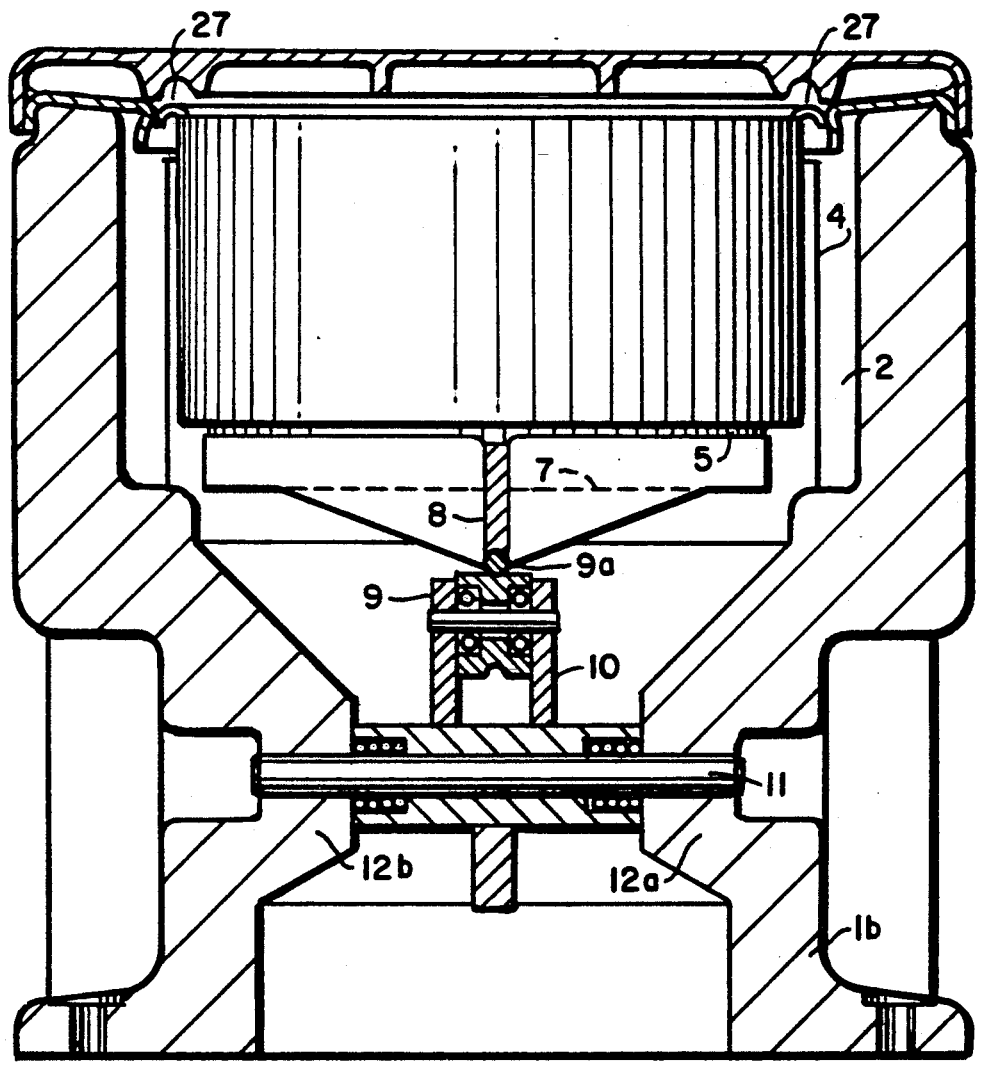
FIG. 4 is a cross-sectional front view of the toilet illustrated in FIG. 1.

The waterless toilet illustrated in FIGS. 1 through 4 has a base 1 in the form of a stool with a bell-shaped cross-section. The inside 2 of the base is accessible from above and accommodates a supporting structure 3 about halfway up. Resting on the structure is a cylindrical sheet-steel tank 4 with a steel bottom 5. The tank is open at the top, where it is surrounded by a projecting edge 6. Below the bottom 5 of the tank 4 is a star-shaped support 7. Support 7 is part of the structure 3. It engages the bottom 5 and can lift it. Support 7 terminates at its lower end in a bead comb 8, which is accommodated in a groove 9a in a supporting roller 9 (cf. FIG. 4). Roller 9 is at the end of a lever 10 that pivots in a shaft 11. The ends of the shaft rest in projecting shoulder 12a and 12b at the bottom 1b of the base.

Lever 10 is activated by a pedal 13 and travels approximately 30°. Depressing the pedal raises roller 9 into the upper position represented by the broken lines in FIG. 1 and hence lifts support 7 and tank 4. Also suspended in support 7 are two helical springs 18 and 19 that are secured by a pin 20 or bore in the opposite end of lever 10. The springs generate a force opposing the upward motion that lowers supporting structure 3 along with tank 4 and a container 15 when pedal 13 is released.

A plastic container 15 is suspended in tank 4. The container has a capacity of approximately 5 liters. It consists of a body 15a and of a rim 16 that is secured to the upper edge of the body. Rim 16 is in the form of a bead 17 that is folded down and out and is round at the top. Its cross-section is more or less in the form of an upside-down J. Rim 16 is made for example from a polyethylene torus about 3 to 5 mm thick. The body 15a of the container is made of polyethylene sheet about 1 mm thick. The body is welded to the rim. As will be evident from the figure, the edge 6 of tank 4 supports rim 16 from below. The suspended container 15 can also be lifted to some extent.

Base 1 ends at the top in an edge 1a. A toilet eat 22 rests on the edge. The seat is more or less in the form of a circular ring open at the bottom. It is dimensioned to allow the bead 17 on container 15 to rest against its inner surface. The result is similar to a conventional toilet seat. Seat 22 is secured to base 1 and can be released from it by threaded fittings 23. The fittings have a projection that engages a groove 21 in edge 1a.

A toilet lid 25 is hinged to the left side of edge 1a in FIG. 1. Toilet lid 25 simultaneously functions as a holder for container lids 26. Container lid 26 is also made of relatively rigid polyethylene and has grooves 27 at the edge for bead 17 to snap into. Container lid 26 also has a handle, which lies narrow in the illustrated state and is accordingly not represented. At the front edge of the toilet lid is a locking bar 29.

As toilet lid 25 pivots down in the direction indicated by broken line D, locking bar 29, which is mounted subject to spring tension against toilet lid 25, advances beyond the outer edge of a fitting 23 and locks under its projection 23a. It can be forced out again to allow it to pivot out. As long as the toilet lid 25 is down, container lid 26 will rest against container 15 with snap-in components 17 and 27 in immediate contact but not snapped together. Once the toilet has been used, the loaded container 15 will be sealed tight by holding down seat 22 and activating pedal 13, which raises supporting structure 3 and forces bead 17 into the matching groove 27 in container lid 26. The result is a hermetic seal strong enough to allow the container, even one weighing as much as 7 kg, to be lifted out by the handle.

It will be evident from the foregoing description that it is possible to employ an inner lid instead of a beaded lid. The inner lid will fit into an appropriately designed rim, one with supporting surfaces and snap-in components in the form of snap-in projections inside the circumference of the container for example. It is required only that the container lid 26 have means for firmly gripping and sealing the rim 16 of the container 15. The container can either be relatively flexible or relatively rigid and non-collapsing. The decision primarily depends on costs. The most appropriate materials are waterproof plastics, but coated paper and similar disposable materials can also be employed.

Figure 5:
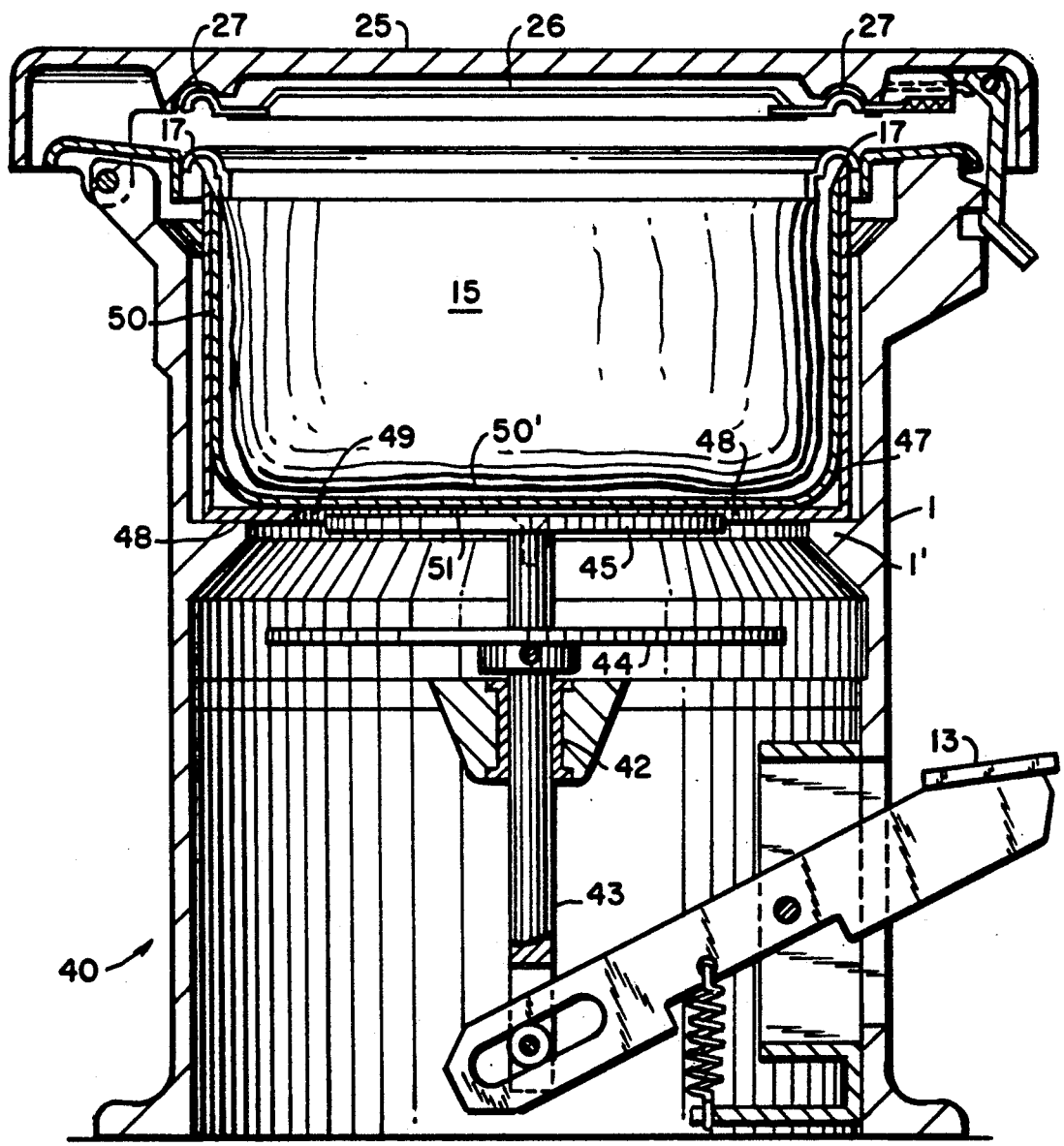
FIGS. 5 and 6 are views similar to those in FIGS. 1 and 2, respectively, but for another embodiment.
Figure 6:
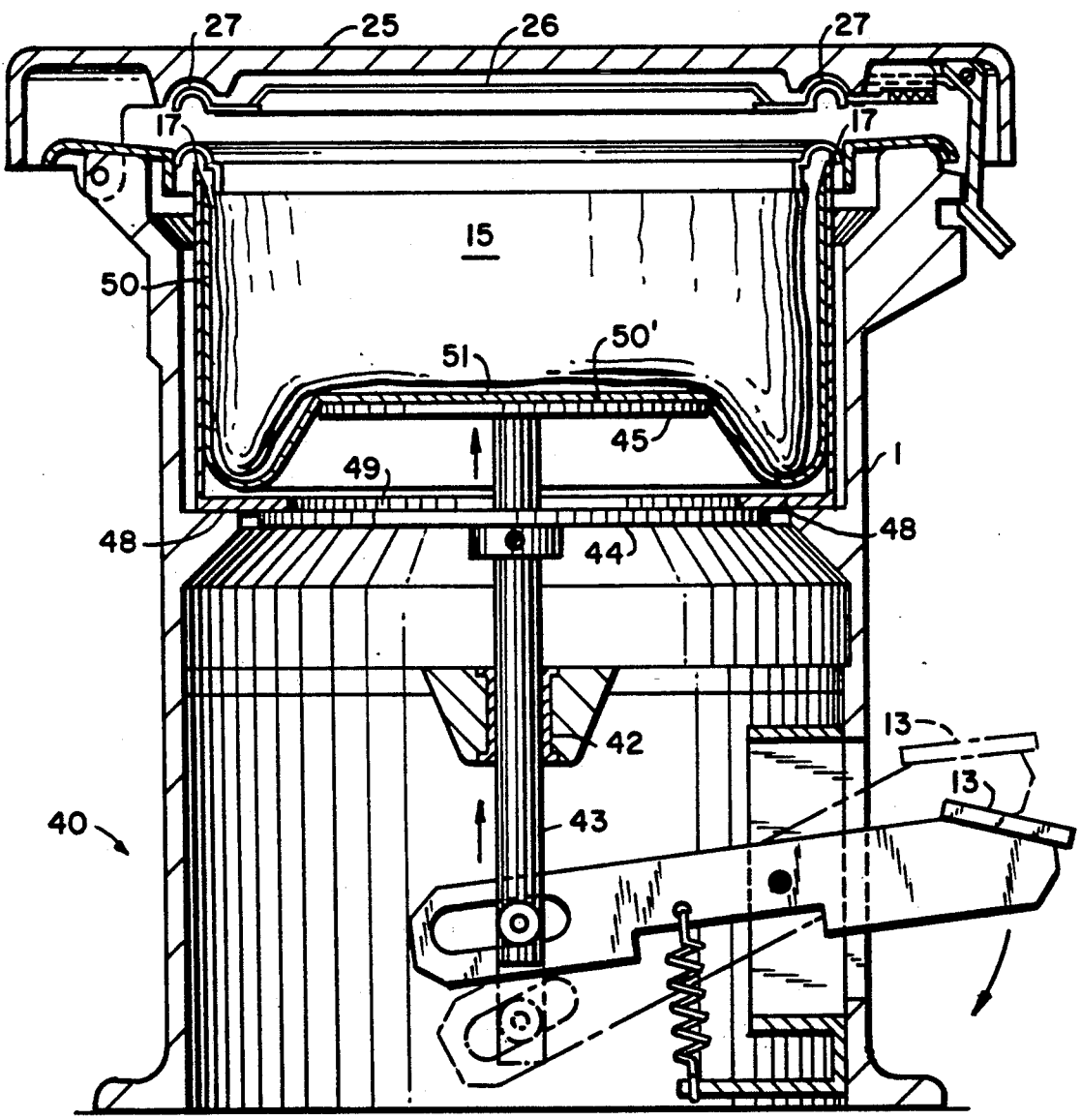

FIGS. 5 and 6 illustrate another preferred embodiment of the invention. This version features supporting structure in the form of a lever-type adjustment 13, one end of which is connected to a rod 43 secured in a sleeve 42. At the other end of the rod two disks 44 and 45 are separately and concentrically mounted on the rod. The upper disk, which terminates the head of the rod has a smaller diameter, and the lower disk 44 has a larger diameter. A high-quality steel tank 46, which extends down to a flange-like annular edge 48 with a large central opening 49 rests on a projection 1' of the housing 1. The diameter of upper disk 45 is smaller and that of lower disk 44 is larger than the diameter of opening 49. Inside the tank 47 is a flower-pot shaped rubber membrane 50 that completely occupies the inside of the pot and covers opening 49 with its base 50'. The membrane is sufficiently resistant to deformation in the vicinity of opening 49 to ensure that the (rubber-lined) tank 47 will be tightly spanned, whether empty or full, meaning that the membrane will hardly sag at that point.

The membrane 50 is supported in this area by small upper disk 45. Suspended inside the rubber-lined tank, as described with reference to the first embodiment, is the container, which is a bag in the conventional sense, with its rigid lid edge.

Once the toilet has been used, the toilet lid 25 is lowered and snapped into place as previously described herein. Pressing down on pedal 13 displaces lever 41 and forces rod 43 up. Smaller disk 45, if it has not already done so, comes into secure contact with rubber bottom 50' in the vicinity of opening 49 and forces it, and hence the tank 47 up until it comes into contact with the container lid 26 in toilet lid 25. Subsequent to this phase, the lid is folded in around the smaller disk 45 until the larger disk 44 comes into contact with the annular edge 48 around the tank 47 and hence terminates the motion of rod 43 in relation to the tank 47. As the force increases, accordingly, the edge of the bag is forced into the matching component on the lid and the bag (container 15) and lid 26 will snap together. This procedure is preceded by a reduction in the volume of the container 15 in that upper disk 44 travels through the limited opening 49, accompanied by deformation of membrane 50, until lower disk 45 comes into contact with edge 48 from below.

This approach represents one way of reducing the volume of the suspended container 15 before the lid is forced into position. The same technical variant can be accomplished with similar stacking mechanisms. Another advantage of compacting the container is that any gas that forms as the waste rots will only fill up the bag without bursting it.

There has thus been shown and described a novel waterless toilet with container with lids for waste which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A waterless toilet comprising, in combination:
   (a) a toilet seat with a central opening;
   (b) a replaceable container having a rim, said container being arranged beneath said opening with said rim adjacent the seat when the toilet is in use, said container being adapted to be closed, removed from the seat, and disposed of once the toilet has been used;
   (c) a container lid configured to cover said container after the toilet has been used, said lid having means for gripping said rim whereby said container is hermetically sealed and can be removed from the toilet by lifting said lid;
   (d) a supporting structure arranged beneath said container, said supporting structure being movable between a lowered position when the toilet is in use and a raised position for removal of the container, said supporting structure having means for engaging said rim with said gripping means to snap said rim and said lid together when in the raised position; and
   (e) means for raising and lowering said supporting structure;
   whereby the supporting structure may be raised after use of the toilet to attach the lid to the container, so that the lid and container may be removed and disposed of as a unit.

2. A waterless toilet as defined in claim 1, wherein the container lid has an edge with a bead that acts as a snap-in component of said gripping means.

3. A waterless toilet as defined in claim 1, wherein the container lid is an inner lid that fits into the rim and wherein said gripping means include supporting and snap-in components in the form of projections.

4. A waterless toilet as defined in claim 1, wherein the container is made from flexible plastic sheet and the container lid and rim are made from a material that is rigid in relation to that of the container.

5. A waterless toilet as defined in claim 1, further comprising a hinged toilet lid that covers the seat and releases container lids from its inner surface.

6. A waterless toilet as defined in claim 5, wherein the gripping means include snap-in components configured to snap together with said rim when the container is disposed vertically and the toilet lid is forced down.

7. A waterless toilet as defined in claim 1, wherein the raising means includes a pedal-activated lever having one end that engages the bottom of the supporting structure.

8. A waterless toilet as defined in claim 1, wherein the toilet further comprises a base in the form of a stool with a depression which is open from above and which is at least partially surrounded by the seat, said container being inserted in said depression.

9. A waterless toilet as defined in claim 8, wherein the supporting structure further comprises a support at the bottom of the depression for the container to rest on.

10. A waterless toilet as defined in claim 9, wherein the supporting structure upholds and supports the container below its rim.

11. A waterless toilet as defined in claim 10, wherein the supporting structure compacts the container before the lid snaps into it.

12. A waterless toilet as defined in claim 10, further comprising a rigid tank that rests on the supporting structure and in which the rim can be inserted or suspended.

13. A waterless toilet as defined in claim 12, wherein the tank has an opening at the bottom that is surrounded by a flanged edge and is spanned by an elastic diaphragm, and wherein the supporting structure has a smaller disk at the top and a larger disk at the bottom, whereby the upper disk can be forced through the opening, deforming the diaphragm, until the lower disk comes into contact with the flanged edge from below.

* * * * *